Patented Oct. 24, 1950

2,527,029

UNITED STATES PATENT OFFICE 2,527,029

COMPOSITION FOR FRESHENING AIR AND METHOD THEREFOR

Guy Sherman Paschal, Sarasota, Fla., assignor to Airkem, Inc., New York, N. Y., a corporation of New York No Drawing. Application July 17, 1946, Serial No. 684,237

14 Claims. (Cl. 167—24)

The invention relates to a method for freshening air and to a composition therefor. More particularly, it pertains to the freshening of air in a confined space and includes correlated improvements and discoveries whereby a marked freshening of the air is effected.

In using the word "freshening" I have in mind the idea which is suggested by the word "fresh" in diametrical opposition to the idea conveyed by the word "stale" when used to describe the condition of an indoor atmosphere.

I have found that there are a number of inherent basic odors common to all forest soil. Whereas forest soils of varying geographical locations have characteristics peculiar to the locale, I have determined that there exists in addition to these characteristic odors of individual locales, a group of odors which exists in all forest soils.

When those substances which are responsible for the common forest soil undertone were extracted from the forest soil, it was found that this extractive upon being dispersed into vitiated indoor atmosphere definitely improved the quality of that atmosphere in that it was observed that it was more agreeable to the senses upon breathing than before such vapors were introduced.

An object of the invention is the provision of a method in accordance with which air is improved or freshened by contact with a composition containing a composite extractive of forest soil. The expression "composite extractive" as used herein in the specification and claims means an extractive containing the components removed from the forest soil by a solvent without subsequent treatment for modification or separation of the constituents.

Another object of the invention is to provide a method whereby air, more especially vitiated air, may be restored by dispersing into the air a solution containing a composite extractive of forest soil per se and in conjunction with other components.

A further object of the invention is the provision of a method and a composition for the treatment of air that may be applied readily, efficiently, and economically to a desired extent, and which is well adapted for utilization in air conditioning systems.

An additional object of the invention is the provision of an air freshening composition of matter containing a composite extractive of forest soil, such extractive being utilized either singly or in compatible admixtures and also in combination with another or other constituents.

A particular object of the invention is to provide an air freshening composition of matter containing a composite extractive of forest duff, i. e. the partly decayed vegetable matter on the forest floor.

Other objects of the invention will in part be obvious and will in part appear hereinafter.

The invention accordingly comprises the several steps, and the relation of one or more such steps with respect to each of the others, and the composition possessing the features and properties which are exemplified in the following detailed disclosure, and the scope of the invention will be indicated in the claims.

In the practice of the invention a freshening of air may be accomplished by contacting the air, more particularly that in confined spaces as places of habitation, recreation and amusement, with a composition containing a composite extractive of forest soil. The forest soil may be various loams, modified plant substance, forest duff, humus, and the like, and these are extracted with a relatively volatile organic solvent, more particularly one having a boiling point from about 30° to about 100° C. The extractive employed contains all of that which is obtained by the extraction process from the forest soil by the solvent, and when such total extractive is contacted, as by dispersing, with air which has become vitiated, the quality thereof is markedly improved, that is freshened. The dispersion may be effected by spraying into air; by contacting air with an absorptive material impregnated with the solution so produced, or by contact with a wick partially immersed in the solution.

Further the extractive may be utilized by dispersing it into an atmosphere without any additional or previous treatment, that is the extractive is employed as it is obtained by treating forest soil with a suitable solvent. However, it is sometimes desirable to remove the solvent, and when this condition pertains, the solvent may be removed by distillation. The residue so obtained may then be taken up in another solvent, and for this purpose it has been found that a deodorized kerosene base, or an aqueous emulsion, or a glycol as ethylene glycol, triethylene glycol and the ethers thereof, gives satisfactory results.

Another advantage attending the removal of the solvent is that under certain conditions the adaptation thereof in air freshening is more practicable, and any considerations relative to inflammability, toxicity, and the like are removed.

Various solvents may be used for the extraction with mention more especially being made of ethyl alcohol, methyl alcohol, methyl ethyl ketone, acetone, petroleum ether, benzene, toluene, xylene, and the like. Extraction of the forest soil may be effected by placing freshly-gathered and quickly-macerated forest soil, as duff, in solvent and agitating until extraction is completed. The solid and liquid are then separated in a suitable manner, and the extract thus produced may be dispersed into air either as such or following removal of the solvent and its replacement by another medium. It has been found that a ratio of forest soil to solvent on a weight basis of about one to one yields a composite extractive well adapted for the freshening of air, however, it will be realized that other ratios varying in both directions might be employed.

As an illustrative embodiment of a manner in which the invention may be practiced the following description is presented. As a forest soil material utilization may be made, for example, of forest duff. Thus, in a typical operation ten pounds of freshly-gathered duff may be placed in the hopper of a grinder which is filled with ethyl alcohol to a point at which the material being ground is submerged. The ethyl alcohol may be the usual 95% alcohol. The duff is thus ground in the presence of the alcohol which, it has been found, impedes deterioration or destruction of ingredients which are especially effective in bringing about a freshening of vitiated air. The ground duff and alcohol pass directly from the grinder into a receptacle containing about ten pounds of ethyl alcohol. This mixture is agitated for a period of time which may be several minutes and is then allowed to stand for a rather extended period of time which suitably may be over-night. The alcoholic extract may then be removed as by pressing, or in a centrifuge, and the alcoholic solution obtained free further from any solid material by filtering. Thus, there is obtained a composite extractive of forest soil which, as above stated, may be utilized in the form in which it is produced by contacting air directly therewith, or the solution may be first freed from extraction solvent and the residue taken up in another solvent or base.

As indicated in the foregoing description, it is important that the extraction be conducted with freshly gathered forest soil inasmuch as the finding has been that substantial chemical change takes place quickly in the material which renders the desired components less effective for the freshening of an atmosphere as, for example, the vitiated air in a confined space. Consequently, the forest soil is ground while immersed in the solvent and is maintained in such condition during the proces of maceration or extraction, thus deleterious change in the essential constituents of the forest soil is definitely diminished.

The proportions, on a solid weight basis, in which the composite extractive is maintained in air are subject to variation as from about 1 to about 20 parts per million, and more particularly in ordinary stale indoor air from 5 to 10 parts. The amount will, of course, be governed by the properties of the composite extractive, or the combination of extractives with or without other compounds, being employed.

The contacting of air whereby a freshening takes place may be with the composition either in solid or in liquid form, and this contact may be brought about by causing the air to flow over the composition placed in a suitable manner, and when in liquid form as a solution, the composition may be dispersed into the air by flowing the air over a body of the solution or by spraying or otherwise introducing the solution into the air. The term "solution" as used herein includes true solutions and compositions wherein one or more of the constituents may be in finely dispersed condition in suspension.

Furthermore, the composition may be absorbed or adsorbed within or upon a suitable carrier or surface with which the air to be freshened is contacted.

The foregoing method in conjunction with the compositions set forth leads to a distinctive improvement in the condition of air, particularly of that in a confined space. It has been my finding that the ingredients above mentioned when dispersed into air impart an invigorating quality thereto, and have a distinctive freshening effect upon the air and upon those breathing such air. They impart to the individual breathing the treated air a feeling of comfort even when the confined air has become vitiated.

A particular field for utilization of the method and the composition and one to which it is well adapted is air conditioning. Frequently the air in air conditioning systems acquires a peculiar stale character, and this may be due to odors of "below threshold value," that is odors which have such a low intensity that the individual receives no positive odor impression. However, even when of low intensity, they may have a depressing effect which is offset by treating air in accordance with the procedure and with the compositions set forth herein.

Further, it has been found that odors present in air conditioning systems whether noticeable or not are due at least in part to bacteria and molds which develop in the solid deposits on gaskets, filters, duct walls, drip pans, and drains in the absence of natural light and which due to the action of such organisms give off an unpleasant odor.

Another odor source is the absorption by dust collecting on filters and duct walls, of odors carried through the system by recirculated air and again given off. Additional sources of odor are the insulating materials, adhesives, viscous filter material, and especially corroded metallic surfaces. The accumulative effect of such odors even when not noticeable may lead to a depressive feeling, and it is to the correction or removal of these odors that the invention is directed.

Accordingly, the invention encompasses a method for freshening air by contacting it with a composition containing a composite extractive of forest soil, as by spraying the composition into air and more particularly by contacting air circulating in an air conditioning system with such composition thus providing a circulating medium in an air conditioning system comprising air having the said composition dispersed therein, and an air freshening composition of matter comprising the composite extractive forest soil as above defined. Such contact can be accomplished also, as above stated, by means of an absorptive material, or a wick carrying the solution.

Since certain changes in carrying out the above method and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statement of the scope of the invention which, as a matter of language, might be said to fall therebetween.

Having described my invention, what I claim as new and desire to secure by Letters Patent is:

1. A method for freshening indoor vitiated air which comprises contacting air with a composition containing a composite extractive of forest soil, said composite extractive having been prepared by treating forest soil directly with an extractant selected from the group consisting of low boiling alcohol, ketone and hydrocarbon extractants and without subsequent modification.

2. A method for freshening indoor vitiated air which comprises dispersing a composition containing a composite extractive of forest soil into air, said composite extractive having been prepared by treating forest soil directly with an extractant selected from the group consisting of low boiling alcohol, ketone and hydrocarbon extractants and without subsequent modification.

3. A method for freshening indoor vitiated air which comprises dispersing a composition containing a composite extractive of forest soil into air in a confined space, said composite extractive having been prepared by treating forest soil directly with an extractant selected from the group consisting of low boiling alcohol, ketone and hydrocarbon extractants and without subsequent modification.

4. A method for freshening indoor vitiated air which comprises dispersing a solution containing a composite extractive of forest soil into air, said composite extractive having been prepared by treating forest soil directly with an extractant selected from the group consisting of low boiling alcohol, ketone and hydrocarbon extractants and without subsequent modification.

5. A method for freshening indoor vitiated air which comprises dispersing a solution containing a composite extractive of forest soil into air by spraying, said composite extractive having been prepared by treating forest soil directly with an extractant selected from the group consisting of low boiling alcohol, ketone and hydrocarbon extractants and without subsequent modification.

6. A method for freshening indoor vitiated air which comprises dispersing a solution containing a composite extractive of forest soil into air by contacting said air with an absorptive material impregnated with said solution, said composite extractive having been prepared by treating forest soil directly with an extractant selected from the group consisting of low boiling alcohol, ketone and hydrocarbon extractants and without subsequent modification.

7. A method for freshening indoor vitiated air which comprises dispersing a solution containing a composite extractive of forest soil into air by contacting said air with a wick partially immersed in said solution, said composite extractive having been prepared by treating forest soil directly with an extractant selected from the group consisting of low boiling alcohol, ketone and hydrocarbon extractants and without subsequent modification.

8. A method for freshening indoor vitiated air which comprises contacting air circulating in an air conditioning system with a composition containing a composite extractive of forest soil, said composite extractive having been prepared by treating forest soil directly with an extractant selected from the group consisting of low boiling alcohol, ketone and hydrocarbon extractants and without subsequent modification.

9. A method for freshening indoor vitiated air which comprises circulating air in an air conditioning system and dispersing into the circulating air a composition containing a composite extractive of forest soil, said composite extractive having been prepared by treating forest soil directly with an extractant selected from the group consisting of low boiling alcohol, ketone and hydrocarbon extractants and without subsequent modification.

10. A method for freshening indoor vitiated air which comprises circulating air in an air conditioning system and dispersing into the circulating air a solution containing a composite extractive of forest soil, said composite extractive having been prepared by treating forest soil directly with an extractant selected from the group consisting of low boiling alcohol, ketone and hydrocarbon extractants and without subsequent modification.

11. A circulating medium in an air conditioning system comprising air having dispersed therein a composition containing a composite extractive of forest soil, said composite extractive having been prepared by treating forest soil directly with an extractant selected from the group consisting of low boiling alcohol, ketone and hydrocarbon extractants and without subsequent modification.

12. A circulating medium in an air conditioning system comprising air having dispersed therein a solution containing a composite extractive of forest soil, said composite extractive having been prepared by treating forest soil directly with an extractant selected from the group consisting of low boiling alcohol, ketone and hydrocarbon extractants and without subsequent modification.

13. A composition of matter for freshening indoor vitiated air comprising a composite extractive of forest soil, said composite extractive having been prepared by treating forest soil directly with an extractant selected from the group consisting of low boiling alcohol, ketone and hydrocarbon extractants and without subsequent modification.

14. A composition of matter for freshening indoor vitiated air comprising a solution containing a composite extractive of forest soil, said composite extractive having been prepared by treatinng forest soil directly with an extractant selected from the group consisting of low boiling alcohol, ketone and hydrocarbon extractants and without subsequent modification.

GUY SHERMAN PASCHAL.

REFERENCES CITED

The following references are of record in the file of this patent:

OTHER REFERENCES

Beckley, J. Agr. Sci., vol. 11, pages 66–8 (1921) thru Chemical Abstracts, vol. 13 (1921), page 1775.

du Bellay et al., Compt. rend., vol. 170, pages 236–8 (1920), thru Chemical Abstracts, vol. 14, page 3467 (1920).

U. Soringer, Bodenkunde u. Pflanzenernahr., vol. 32, pages 129–46 (1943), thru Chemical Abstracts, vol. 38 (1944), page 6454.

Hagers, Handbuch der Pharmazeutischen Praxis, vol. I, 1925, J. Springer, Berlin, page 610.